US012579732B2

(12) United States Patent
Schpok

(10) Patent No.: US 12,579,732 B2
(45) Date of Patent: Mar. 17, 2026

(54) FACE-ORIENTED GEOMETRY STREAMING

(71) Applicant: Google LLC, Mountain View, CA (US)

(72) Inventor: Joshua Sam Schpok, Los Angeles, CA (US)

(73) Assignee: GOOGLE LLC, Mountain View, CA (US)

( * ) Notice: Subject to any disclaimer, the term of this patent is extended or adjusted under 35 U.S.C. 154(b) by 256 days.

(21) Appl. No.: 18/247,682

(22) PCT Filed: May 19, 2022

(86) PCT No.: PCT/US2022/030105
§ 371 (c)(1),
(2) Date: Apr. 3, 2023

(87) PCT Pub. No.: WO2023/224627
PCT Pub. Date: Nov. 23, 2023

(65) Prior Publication Data
US 2024/0371079 A1 Nov. 7, 2024

(51) Int. Cl.
G06T 15/20 (2011.01)
(52) U.S. Cl.
CPC .......... G06T 15/20 (2013.01); G06T 2210/08 (2013.01)
(58) Field of Classification Search
CPC ... G06T 15/20; G06T 2210/08; G06T 17/005; G06F 3/011
See application file for complete search history.

(56) References Cited

U.S. PATENT DOCUMENTS

| | | | |
|---|---|---|---|
| 2015/0109293 A1* | 4/2015 | Wang | .................... G06T 15/405 |
| | | | 345/422 |
| 2017/0124767 A1* | 5/2017 | Foust | ..................... G06F 3/011 |

(Continued)

FOREIGN PATENT DOCUMENTS

| | | | |
|---|---|---|---|
| EP | 3435670 | 1/2019 | |
| JP | 2020528619 | * 9/2020 | ............. G01C 21/32 |

(Continued)

OTHER PUBLICATIONS

International Preliminary Report on Patentability for PCT/US2022/030105, mailed on Nov. 28, 2024, 9 pages.

(Continued)

*Primary Examiner* — Said Broome
*Assistant Examiner* — Denis Vasiliy Minko
(74) *Attorney, Agent, or Firm* — DORITY & MANNING, P.A.

(57) ABSTRACT

The present disclosure provides computer-implemented methods, systems, and devices for optimizing data for use in depicting virtual worlds. A computing system accesses data associated with a plurality of three-dimensional tiles representing a portion of a virtual space. The computing system generates a plurality of sub-tiles, wherein a respective sub-tile in the plurality of sub-tiles represents a portion of one or more objects associated with a viewing orientation. The computing system receives a request for data associated with one or more of the three-dimensional tiles, the request including a location within the virtual space and a viewing orientation. The computing system determines the one or more of the three-dimensional tiles based on the location. The computing system selects one or more sub-tiles from the one or more of the three-dimensional tiles, based on the viewing orientation. The computing system transmits the selected one or more sub-tiles for display.

18 Claims, 6 Drawing Sheets

(56)         References Cited

U.S. PATENT DOCUMENTS

2019/0197786 A1      6/2019  Molyneaux et al.
2019/0373264 A1 *  12/2019  Chong ................... H04L 69/04

FOREIGN PATENT DOCUMENTS

| JP | 2020528619 A | * | 9/2020 | ........... H04N 13/128 |
| KR | 20190072105 | * | 6/2019 | ............ G01C 21/32 |
| KR | 20190072105 A | * | 6/2019 | ............ G06F 16/29 |
| WO | WO-2016036772 A1 | * | 3/2016 | ........... G06V 30/422 |

OTHER PUBLICATIONS

International Search Report for Application No. PCT/US2022/
030105, mailed on Feb. 28, 2023, 5 pages.

* cited by examiner

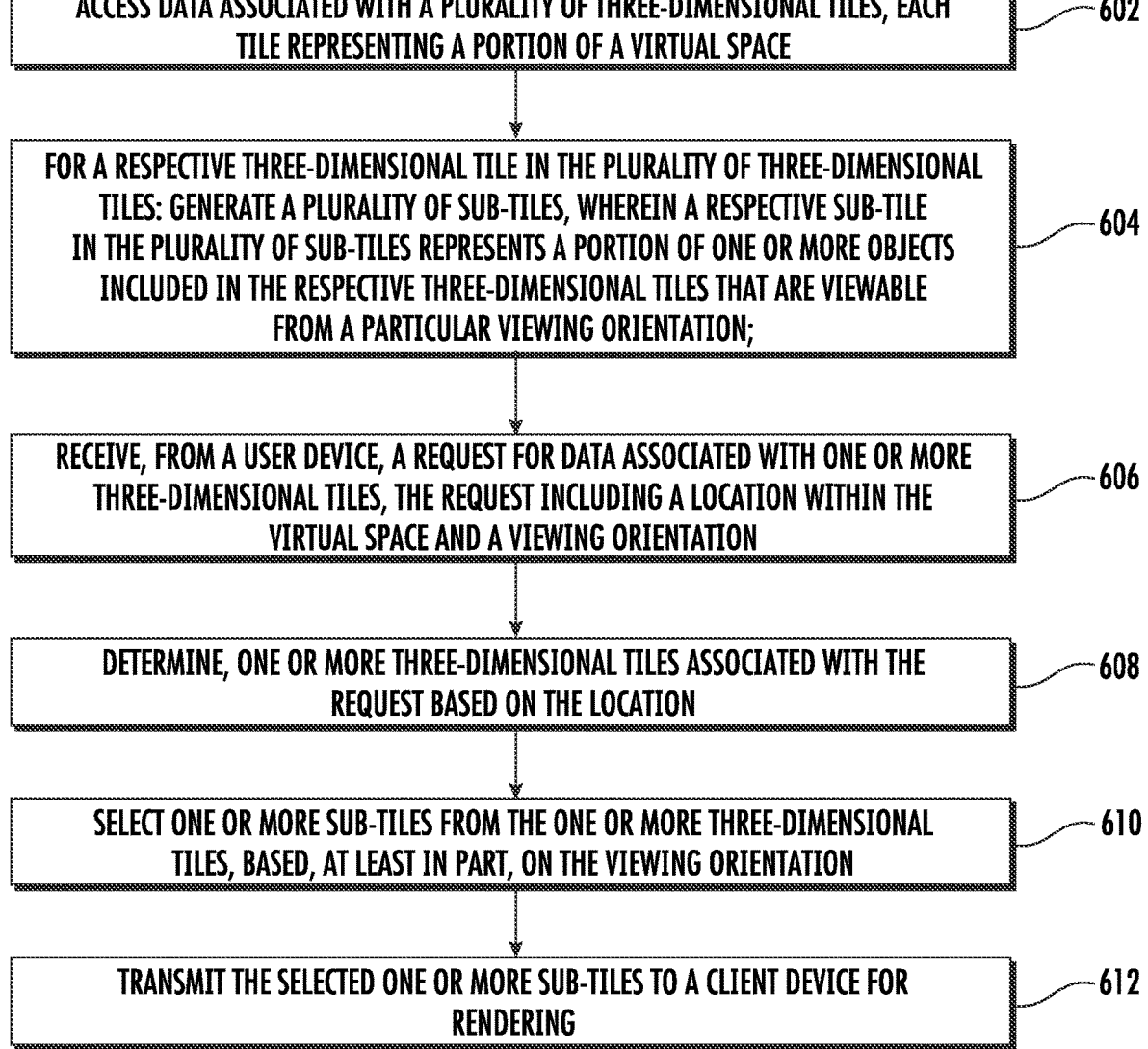

ACCESS DATA ASSOCIATED WITH A PLURALITY OF THREE-DIMENSIONAL TILES, EACH TILE REPRESENTING A PORTION OF A VIRTUAL SPACE — 602

FOR A RESPECTIVE THREE-DIMENSIONAL TILE IN THE PLURALITY OF THREE-DIMENSIONAL TILES: GENERATE A PLURALITY OF SUB-TILES, WHEREIN A RESPECTIVE SUB-TILE IN THE PLURALITY OF SUB-TILES REPRESENTS A PORTION OF ONE OR MORE OBJECTS INCLUDED IN THE RESPECTIVE THREE-DIMENSIONAL TILES THAT ARE VIEWABLE FROM A PARTICULAR VIEWING ORIENTATION; — 604

RECEIVE, FROM A USER DEVICE, A REQUEST FOR DATA ASSOCIATED WITH ONE OR MORE THREE-DIMENSIONAL TILES, THE REQUEST INCLUDING A LOCATION WITHIN THE VIRTUAL SPACE AND A VIEWING ORIENTATION — 606

DETERMINE, ONE OR MORE THREE-DIMENSIONAL TILES ASSOCIATED WITH THE REQUEST BASED ON THE LOCATION — 608

SELECT ONE OR MORE SUB-TILES FROM THE ONE OR MORE THREE-DIMENSIONAL TILES, BASED, AT LEAST IN PART, ON THE VIEWING ORIENTATION — 610

TRANSMIT THE SELECTED ONE OR MORE SUB-TILES TO A CLIENT DEVICE FOR RENDERING — 612

FIG. 6

FACE-ORIENTED GEOMETRY STREAMING

PRIORITY CLAIM

This application is based upon and claims the right of priority under 35 U.S.C. § 371 to International Application No. PCT/US2022/030105 filed on May 19, 2022, which is incorporated by reference herein.

FIELD

The present disclosure relates generally to providing data for rendering images of a virtual world. More particularly, the present disclosure relates to optimizing the data used for rendering three dimensional views based on viewing angles.

BACKGROUND

As computer technology has improved, the number and type of services that can be provided to users have increased dramatically. The services provided via computer technology include providing data associated with displaying three-dimensional virtual worlds. Such a service can provide data needed to display a virtual world to a client system upon request.

SUMMARY

Aspects and advantages of embodiments of the present disclosure will be set forth in part in the following description, or can be learned from the description, or can be learned through practice of the embodiments.

An example aspect is directed towards a computer-implemented method. The method comprises accessing, by a computing system comprising one or more computing devices, data associated with a plurality of three-dimensional tiles, each three-dimensional tile representing a portion of a virtual space. The method further comprises, for a respective three-dimensional tile in the plurality of three-dimensional tiles: generating, by the computing system, a plurality of sub-tiles, wherein a respective sub-tile in the plurality of sub-tiles represents a portion of one or more objects included in the respective three-dimensional tile that is associated with a particular viewing orientation. The method further comprises receiving, by the computing system and from a client device, a request for data associated with one or more of the three-dimensional tiles, the request including a location within the virtual space and a viewing orientation. The method further comprises determining, by the computing system, the one or more of the three-dimensional tiles associated with the request based on the location. The method further comprises selecting, by the computing system, one or more sub-tiles from the one or more of the three-dimensional tiles, based, at least in part, on the viewing orientation. The method further comprises transmitting, by the computing system, the selected one or more sub-tiles to the client device for display.

Another example aspect of the present disclosure is directed to a computing device. The computing device comprises one or more processors; and a computer-readable memory. The computer-readable memory stores instructions that, when executed by the one or more processors cause the device to access data associated with a plurality of three-dimensional tiles, each three-dimensional tile representing a portion of a virtual space. The instructions further cause the device to, for a respective three-dimensional tile in the plurality of three-dimensional tiles: generate a plurality of sub-tiles, wherein a respective sub-tile in the plurality of sub-tiles represents a portion of one or more objects included in the respective three-dimensional tile that is associated with a particular viewing orientation. The instructions further cause the device to receive, from a client device, a request for data associated with one or more of the three-dimensional tiles, the request including a location within the virtual space and a viewing orientation. The instructions further cause the device to determine the one or more of the three-dimensional tiles associated with the request based on the location. The instructions further cause the device to select one or more sub-tiles from the one or more of the three-dimensional tiles, based, at least in part, on the viewing orientation. The instructions further cause the device to transmit the selected one or more sub-tiles to the client device for display.

Another example aspect of the present disclosure is directed towards a computer-readable medium storing instructions. The instructions, when executed by one or more processors, cause the one or more processors to access data associated with a plurality of three-dimensional tiles, each three-dimensional tile representing a portion of a virtual space. The instructions further cause the one or more processors to, for a respective three-dimensional tile in the plurality of three-dimensional tiles: generate a plurality of sub-tiles, wherein a respective sub-tile in the plurality of sub-tiles represents a portion of one or more objects included in the respective three-dimensional tile that is associated with a particular viewing orientation. The instructions further cause the one or more processors to receive, from a client device, a request for data associated with one or more of the three-dimensional tiles, the request including a location within the virtual space and a viewing orientation. The instructions further cause the device to determine the one or more of the three-dimensional tiles associated with the request based on the location. The instructions further cause the one or more processors to select one or more sub-tiles from the one or more of the three-dimensional tiles, based, at least in part, on the viewing orientation. The instructions further cause the one or more processors to transmit the selected one or more sub-tiles to the client device for display.

Other aspects of the present disclosure are directed to various systems, apparatuses, non-transitory computer-readable media, user interfaces, and electric devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 6 illustrates an example flow diagram in accordance with example embodiments of the present disclosure.

DETAILED DESCRIPTION

Figure 1:
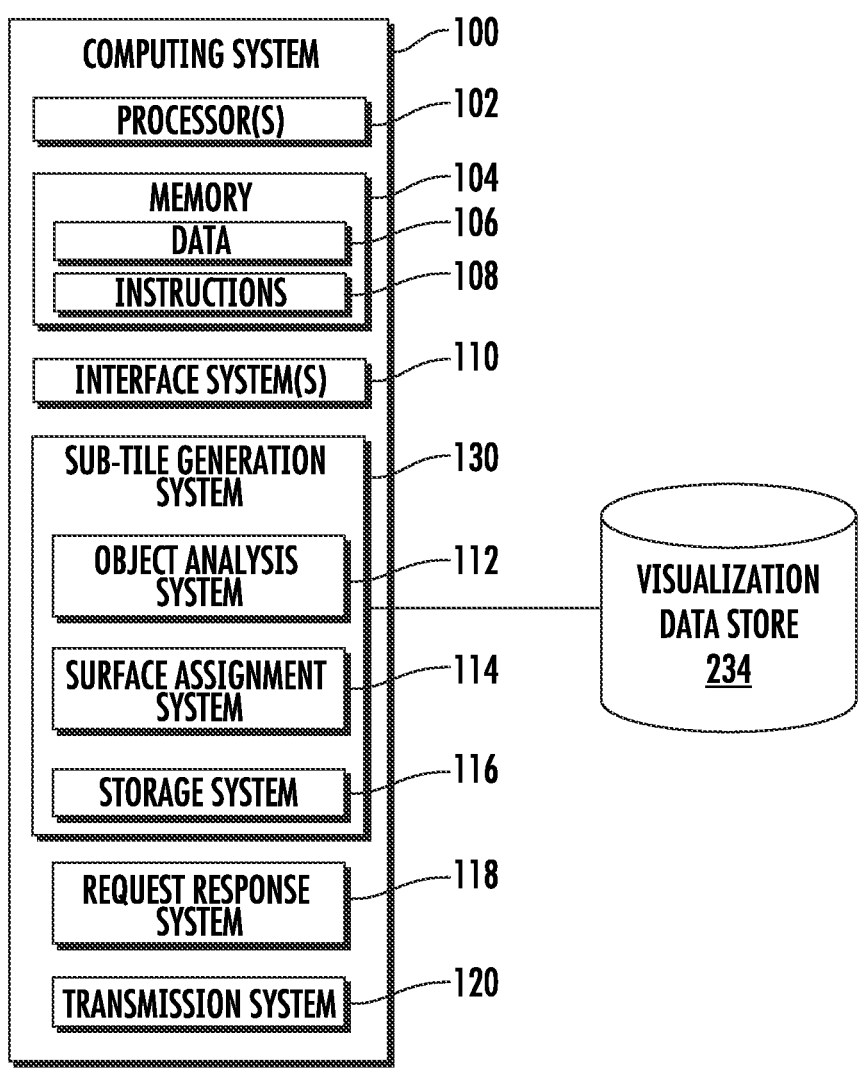
FIG. 1 illustrates an example computing environment including a user computing device in accordance with example embodiments of the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made to the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Generally, the present disclosure is directed to a system for increasing the efficiency of data server systems that provide data associated with virtual worlds or virtual depictions of the physical world. The amount of data associated with rendering and displaying virtual worlds can be extremely large. As a result, large virtual worlds can be divided into a plurality of volumetric portions. These volumetric portions can be referred to as three-dimensional tiles and the three-dimensional tiles can define the contents and properties of a particular area or volume of a virtual world.

A server system can determine which three-dimensional tiles are needed to render one or more images from a particular viewpoint. For example, the determination of which three-dimensional tiles are needed to render can be based on a visibility measurement. The visibility measurement can determine what should be rendered as visible based on the location at which the viewing entity is located within the virtual world and the viewing orientation at which the entity is viewing the world.

A client system can request information based on their location and the server system can respond by determining which three-dimensional tiles are visible to the viewing entity. Each three-dimensional tile can include data describing the contents of the associated volumetric portion of the virtual world. For example, the three-dimensional tile can include data describing the size, placement, appearance, and orientation of one or more objects. In some examples, each object can comprise a plurality of faces arranged in a triangulated mesh. A face is a flat surface or planar region that forms the boundary of a solid object.

In some cases, using the data associated with the entire tile to render an image can be wasteful because, for each possible viewing orientation, some of the objects (or faces) cannot be viewed. If data describing objects and faces that cannot be viewed is used when rendering an image (or series of images) to display to a user, these objects and/or faces will be pruned. The power and processor time used to render and then prune these objects and faces is wasted.

To reduce the amount of wasted resources, the tile data can be preprocessed such that unviewable objects and faces are not used in rendering or transmitted to a client device for rendering. To do so, a data processing system can generate a plurality of sub-tiles for each three-dimensional tile in the plurality of three-dimensional tiles that represent the entire virtual world. In some examples, each sub-tile can include only the information necessary to display the contents of a three-dimensional tile from a particular viewing orientation. For example, the objects and faces visible when a volumetric portion is viewed from above are different from the objects and faces visible when the volumetric portion is viewed from the western side. Once the sub-tiles have been generated for each of the plurality of three-dimensional tiles, the sub-tiles can be used to respond to user requests, rather than the entire three-dimensional tile.

In some examples, a client system can send a request to a server system associated with the virtual world. In some examples, the request can include a location of the viewer within the virtual world and a viewing orientation of the viewer. It should be noted that viewing orientation is used herein to represent both the orientation (relative to a set of coordinates defined with respect to the virtual world) and the width, height, and depth of the viewing window.

Based on the received location, the server system can identify one or more relevant three-dimensional tiles that will be in (at least partially) the view area. The server system can use the viewing orientation to select one or more sub-tiles for each identified three-dimensional tile. The sub-tiles can include data that can be used to generate an image of the contents of one or more three-dimensional tiles as seen from the viewing orientation submitted with the request. The image (or images) can be rendered at the server system, at the client system, or one or more steps of the rendering process can be completed on some combination of both the client system and the server system.

Once sub-titles have been generated for all the three-dimensional tiles, a client system can transmit a request for tile information from a server system that has access to the stored sub-tiles. The server system can receive a request that includes a location within the virtual space and a viewing orientation. Using the location within the virtual space, the server system can identify one or more three-dimensional tiles associated with that space. The server system can use the viewing orientation to identify the particular viewing angle at which each of the identified tiles is being viewed. Using this information, the server system can select only the sub-tiles that are associated with the viewing orientation included within the request. In some implementations, only the selected sub-tiles are used to render a virtual image for display on a client system. By removing or otherwise not including elements that are not visible from certain viewing angles, the system can significantly reduce the time and processing power needed to render a scene for a user.

For example, a client system can transmit a request to a server system indicating a request for image data for a viewer at a particular location in a virtual world while looking west. The server system can receive the request and identify one or more three-dimensional tiles visible to a viewer looking west from the particular location. The server system can select one or more sub-tiles from each three-dimensional tile. The selected sub-tiles can be only those sub-tiles associated with the viewer looking from the west. In this example, each three-dimensional tile is broken down into six sub-tiles, based on the view from above, the view from below, the view from the east, the view from the west, the view from the north, and the view from the south. Thus, the server system can access the sub-tile associated with viewing the three-dimensional tile from the west. This sub-tile data can be transmitted to the client system while sub-tile data for data that will not be visible will not be included because they cannot be viewed by the user from that angle. When the image later is rendered for display, only those portions of the sub tiles that were visible will be used during the rendering as a result the rendering will require less memory and computational power, and the bandwidth needed to transfer data to the client system will be reduced.

More specifically, a server computing system can be associated with a service that provides visualization data associated with a virtual world or virtual augmentation for overlap of the physical world. In some examples, the virtual world can be associated with a video game engine, an augmented reality application, a virtual world application, or with a 3D geographic information system (GIS) implementation. In some examples, the entire set of data that describes such virtual worlds can be so large that it is not feasible to store all that data in the memory of a single computing device (e.g., the client computing device of a user). Thus, rather than store all visualization data (e.g., the data necessary to render appropriate images of a virtual world) on a user computing device, a server system (e.g., one or more computing devices with which the client computing can communicate over a network) can store the data and, upon request, deliver the relevant visualization data to the client system.

To efficiently provide the visualization data, the server system can divide up the full area of a virtual world into a plurality of three-dimensional tiles, each three-dimensional tile being associated with a respective volumetric portion of the virtual world. For example, each three-dimensional tile can be a standard size (e.g., a 10-meter cube). In other examples, the three-dimensional tiles can be other sizes. Additionally, in some examples, the three-dimensional tiles can be of different sizes, depending on the amount of content included in each three-dimensional tile. Thus, areas of the virtual world with a high density of objects can have smaller tiles and areas with less density can have larger tiles. In some examples, the three-dimensional tiles can be arranged in a hierarchical structure, such that child tiles in the hierarchical structure include more details or textures at a higher resolution than the parent tiles.

In some examples, the volumetric portions (e.g., three-dimensional tiles) can include data describing one or more objects within the area of the virtual world associated with the three-dimensional tile. In some examples, the data can be described as pre-image data that includes a triangulated mesh of faces, information about the object's location, textures to be overlaid on the object, information about lighting, and so on. In some examples, the data can describe a plurality of faces associated with each object. These faces can be explicitly referred to by the data describing the object. In other examples, the faces can be determined based on the data. For example, if the objects are represented by a wireframe sketch of point, that underlying set of points can be analyzed to determine a plurality of faces that make up the object.

In some examples, each face can have an associated appearance, position, and orientation. The object and face data associated with each tile can be used to render the scene such that when the area of the tile is to be displayed to the user, the system can generate images appropriate for the view described by the request based on this data. Because the objects in the three-dimensional tiles are three-dimensional, some of the data describing objects will describe a portion of the object that will not be visible from a particular viewing orientation.

Thus, it would be advantageous to be able to discard the portions of objects that are not visible to a particular viewer at a particular location. Existing solutions can discard this additional data during the rendering process. In order to improve the efficiency of the system, the server system (or a related processing system) can generate, for each volumetric portion, a plurality of sub-tiles. In some examples, the plurality of sub-tiles can include six sub-tiles, each sub-tile representing the viewing angle from a side of a cube. Thus, the sub-tiles can be associated with a viewer above (+y dimension), a viewer below (−y dimension), a viewer in front (+z dimension), a viewer behind (−z dimension), a viewer to the left (−x dimension), and a viewer to the right (+x dimension). Each sub-tile can be associated with the view that would be visible to a user from a particular viewing orientation. In this way, the three-dimensional tiles can be separated into a priority of different sub-tiles, each sub-tile associated with a particular viewing orientation.

In some examples, the sub-tiles can be paired such that a sub-tile is paired with the sub-tile associated with the opposite viewing orientation. When a request is received, only one of the two tiles needs to be used to fulfill the request because no viewing angle will be able to view both a first sub-tile associated with a particular orientation and its opposite sub-tile, which represents the view from the opposite orientation.

Once the number of sub-tiles and their associated orientations are determined, the server system can access the data associated with a particular three-dimensional tile. As noted above, this data can include a plurality of faces associated with a plurality of objects in the three-dimensional tile. Each face can be analyzed to determine its orientation. The face can then be assigned to a sub-tile with the most similar orientation. For example, a cosine similarity can be calculated between the angle of a respective face and the orientation of each sub-tile. The respective face can be assigned to the sub-tile based on the results of the cosine similarity. Each face can be assigned to a single sub-tile.

Once all the faces in a three-dimensional tile have been assigned to a sub-tile, all the sub-tiles and the associated faces can be stored at a server system for later retrieval. In some examples, a user can request visual information for a particular position within the virtual space. Such a request can be sent to a server system and can include a location at which the visual data is to be requested and a viewing angle at which the view is to be taken. The server system can use this information to identify the particular three-dimensional tiles that are relevant to the request. For each relevant three-dimensional tile, the server system can identify the particular sub-tiles that are in view for the user. In some examples, the viewing orientation is associated with more than one sub-tile. For example, a viewer to the northeast can see both the north and east side some portions of the three-dimensional tile. Thus, the server system can select all sub-tiles that represent a viewing orientation that is at least partially in view. The sub-tiles that are visible for a particular viewing orientation can be half or less than half of the total sub-tiles.

The data associated with each selected sub-tile can be transmitted to the requesting user. In this case, the total amount of data transmitted is significantly reduced because the data associated with faces that are not visible to the user is not transmitted. In other examples, the server system itself can render or perform one or more pre-rendering steps and then transfer the rendered or partially rendered data to the client system. In this case, the server system can reduce its workload by reducing the amount of data needed to be used during the rendering steps.

Alternatively, the server system can first identify the particular viewpoint that would be visible from the location of the request to determine the appropriate group of sub-tiles. For example, if the sub-tiles are stored in groups such that all sub-tiles with a similar viewing orientation are grouped together, the server system can determine which group is relevant to the request, and then select the sub-tiles associated with the visible three-dimensional tiles from that group. Thus, if the viewpoint orientation is from the west, the server system can search within the west sub-tile group for sub-tiles associated with the visible three-dimensional tiles.

Technical benefits of the systems and methods can include reducing the amount of data transferred to a client system such that less bandwidth and memory are needed. In addition, the disclosed technology reduces the amount of data used to render a scene, resulting in less power usage and less processing time. Specifically, a server system providing data for visualizing a virtual space can reduce the amount of data transmitted to a client system by half or more based on the particular viewpoint orientation. Similar reductions can be achieved in power usage due to using half (or fewer) of the total sub-tiles to render any particular view. Both the server system and a client system have a reduced need for bandwidth and memory to store the relevant data. In addition, the rendering system (either at the server or the client) uses less power and processing time to render images for display. Reducing power usage can increase the useful life of a computing system running on batteries. Overall, these benefits reduce the time and computational cost of rendering images for display and represent an improvement to the computing system as a whole.

With reference now to the Figures, example embodiments of the present disclosure will be discussed in further detail.

FIG. 1 depicts an example computing system 100 according to example embodiments of the present disclosure. In some example embodiments, the computing system 100 can be any suitable device, including, but not limited to, a smartphone, a tablet, a laptop, a desktop computer, a server computing system, or any other computing device that is configured such that it can allow a person to execute a application associated with providing data for a virtual representation of a space or access a virtual world data service at a server computing system. The computing system 100 can include one or more processor(s) 102, memory 104, one or more interface systems 110, a sub-tile generation system 130, a request response system 118, and a transmission system 120.

The one or more processor(s) 102 can be any suitable processing device, such as a microprocessor, microcontroller, integrated circuit, or other suitable processing device. The memory 104 can include any suitable computing system or media, including, but not limited to, non-transitory computer-readable media, RAM, ROM, hard drives, flash drives, or other memory devices. The memory 104 can store information accessible by the one or more processor(s) 102, including instructions 108 that can be executed by the one or more processor(s) 102. The instructions can be any set of instructions that when executed by the one or more processor(s) 102, cause the one or more processor(s) 102 to provide the desired functionality.

In particular, in some devices, memory 104 can store instructions for implementing the one or more interface systems 110, the sub-tile generation system 130, the request response system 118, and the transmission system 120. The computing system 100 can implement the one or more interface systems 110, the sub-tile generation system 130, the request response system 118, and the transmission system 120 to execute aspects of the present disclosure, including accessing volumetric portion data (e.g., three dimensional tile data) for a plurality of sub-sections of a virtual three-dimensional world, generating, for each three-dimensional tile of the virtual world (e.g., each tile) a plurality of sub-tiles, storing the sub-tiles, receiving a request for data to generate a visual depiction of the three-dimensional space, selecting one or more sub-tiles to use to generate the visual depiction, and transmitting the selected one or more sub-tiles (or a rendered image or pre-render image data) to a client computing device for display.

It will be appreciated that the terms "system" or "engine" can refer to specialized hardware, computer logic that executes on a more general processor, or some combination thereof. Thus, a system or engine can be implemented in hardware, application-specific circuits, firmware, and/or software controlling a general-purpose processor. In one embodiment, the systems can be implemented as program code files stored on a storage device, loaded into memory, and executed by a processor or can be provided from computer program products, for example, computer executable instructions, which are stored in a tangible computer-readable storage medium such as RAM, hard disk, or optical or magnetic media.

Memory 104 can also include data 106, such as visualization data associated with the virtual world, that can be retrieved, manipulated, created, or stored by the one or more processor(s) 102. In some example embodiments, such data can be accessed, displayed, or transmitted as needed.

In some example embodiments, the computing system 100 includes one or more interface systems 110, a sub-tile generation system 130, a request response system 118, and a transmission system 120.

The one or more interface systems 110 can be interface allows the computing system 100 to interact with other computing devices over a network. In some examples, the computing system 100 can be a server system that provides data to the client computing systems of users for use in depicting the virtual world in a display associated with the users. In some examples, the data requests are for data used to display augmented reality visualizations that are displayed as a layer on top of images of the physical world. In other examples, the virtual worlds can be associated with a virtual reality display, a virtual game world, a virtual representation of the physical world, or any other virtual depictions of a space.

In some examples, the one or more interface systems can include an application programming interface (API). An API can have an associated specification that describes the standard way to interact with the API to achieve a desired result offered by the service for which the API is associated. In this example, the API serves to act as an interface between one or more client computing systems and a server system associated with a virtual world service offered by the computing system 100.

In some examples, the one or more interface systems 110 can request and receive requests from a remote computing system. For example, if the data associated with the three-dimensional tiles of a virtual world are stored at a remote location, the computing system 100 can request the tile data from the remote system as needed.

A sub-tile generation system 130 can comprise an object analysis system 112, a face assignment system 114, and a storage system 116. In some examples, the object analysis system 112 can access data associated with one or more volumetric portions of a virtual space (e.g., three-dimensional tiles). In some examples, the tile data is accessed from the visualization data store 234. In other examples, the tile data can be accessed via an interface system from a remote server.

In some examples, the tile data can include data describing one or more objects that are located within the tile area. In other examples, the tile data can describe the size of the three-dimensional tile, one or more conditions that exist within the three-dimensional tile, and any other information needed to visually represent the contents of a particular tile. In some examples, each tile can be part of a hierarchical data structure. In this type of hierarchical data structure, one root or parent tile can represent the entire volumetric portion. One or more child tiles can depend on the parent tile and can represent subsections of the entire tile at a higher resolution. Those child tiles themselves can have child tiles such that tiles lower in the hierarchical structure low higher resolution data of a smaller total area than the parent tile. In this way, an area within a particular tile can be rendered at a higher resolution by including data from child tiles of the specific tile at which you are rendering.

Once the tile data has been accessed, the object analysis system 112 can analyze the tile data to identify one or more objects in the data. In some examples, the objects in the data can be defined based on data describing the location of the object within the tile, one or more points that describe the wireframe of the object (e.g., the objects boundaries), data describing the location within the tile of the object, and data describing one or more textures to be applied to the object. For example, if one of the objects is a building, the data can describe where the building is located including one or more points that determine the location of each wall of the building (including the roof), and data describing the appearance of the building from each side (e.g., each face associated with the building).

Once the objects have been identified, the object analysis system 112 can determine one or more faces of the object. In some examples, the objects are defined by a series of faces or that comprise the outer bounds of the object and include data for the appearance of the object. As noted above, face is a flat surface or planar region that forms the boundary of a solid object Thus, the faces can either be read from the data or determined based on the position of one or more vertices. Each determined face can have an associated position, appearance, and angle. The face data can be transmitted to the face assignment system 114.

The face assignment system 114 can determine the number of sub-tiles that are going to be generated for each three-dimensional tile. For example, the face assignment system 114 can generate six sub tiles for each three-dimensional tile. The six sub-tiles can represent the view of the tile from the top, the bottom, the front, the back, the left, and the right. These viewpoints can also be referred to as x, y, and z dimensions. In some examples, a particular sub-tile can have an associated opposite sub-tile. The opposite sub-tile can have a viewing orientation that is the opposite of the respective sub-tile. For example, the sub-tile associated with the view from the top can be paired with the sub-tile associated with the view from the bottom. These two sub-tiles are paired because the viewing angle from the top is the opposite of the viewing angle for the bottom. When using x, y, and z terms to refer to the viewpoint of a particular sub-tile, the opposite sub-tile for the +x sub-tile can be the −x sub-tile.

The face assignment system 114 can determine, for each face in a particular tile, which sub-tile the face should be assigned to. To do so, the face assignment system 114 can compare the angle associated with the face and the viewing angle associated with the sub-tile. The face can then be assigned to the sub-tile to which it is most closely associated. In some examples, this comparison can be accomplished by determining the normal vector for each face and determining the angle between the two normal vectors (e.g., using cosine similarity). Other methods of determining the difference can be used.

The face assignment system 114 can then assign a given face to the sub-tile that has an associated viewing angle that most closely matches the angle of the face. In this way, all faces can be assigned to one sub-tile. In some examples, if the tile data is arranged in a hierarchical structure, data associated with child tiles can have faces that are assigned a particular sub-tile as well. In this way, the sub-tiles can contain all necessary data for displaying at a requested resolution. Once all the faces have been assigned, the sub-tiles can be transmitted to the storage system 116. The storage system 116 can store the sub-tile data (including the associated face data) in the visualization data store 234.

In some examples, the computing system 100 includes a request response system. The request response system 118 can receive, via the one or more interface systems, a request from a client system for visual data for a particular location in a virtual world. In some examples, the request can include a location within the virtual world and a viewing angle at which the location will be viewed.

In some examples, the request response system 118 can analyze the request to identify one or more tiles that are associated with the location and/or the viewing orientation. For example, the request can include a set of coordinates that relate to a specific location within a virtual world. The request response system 118 can identify the tile in which the location is located. In addition to the tile in which the location included in the request is located, the request response system 118 can determine which other tiles will be in view based on the viewing orientation of the request and/or the distance at which the viewer can see objects.

For each tile determined to be included in a viewing window, the request response system 118 can select one or more sub-tiles based on the angle at which the tile is being viewed. In some examples, the selected sub-tiles can be less than half of all the total sub-tiles. For example, only one of each sub-tile pair can be selected at a time because they represent opposite viewing angles. In some examples, the transmission system 120 can transmit the selected sub-tiles to the requesting client system.

Additionally, or alternatively, the selected sub-tiles can be used by the computing system 100 to render one or more images for transmission to a client system for display. Additionally, or alternatively, the selected sub-tiles can be used to perform one or more preprocessing steps that can produce a processed version of the sub-tiles. The processed version of the sub-tiles can then be transmitted via the transmission system 120 to the requesting client system for rendering.

Figure 2:
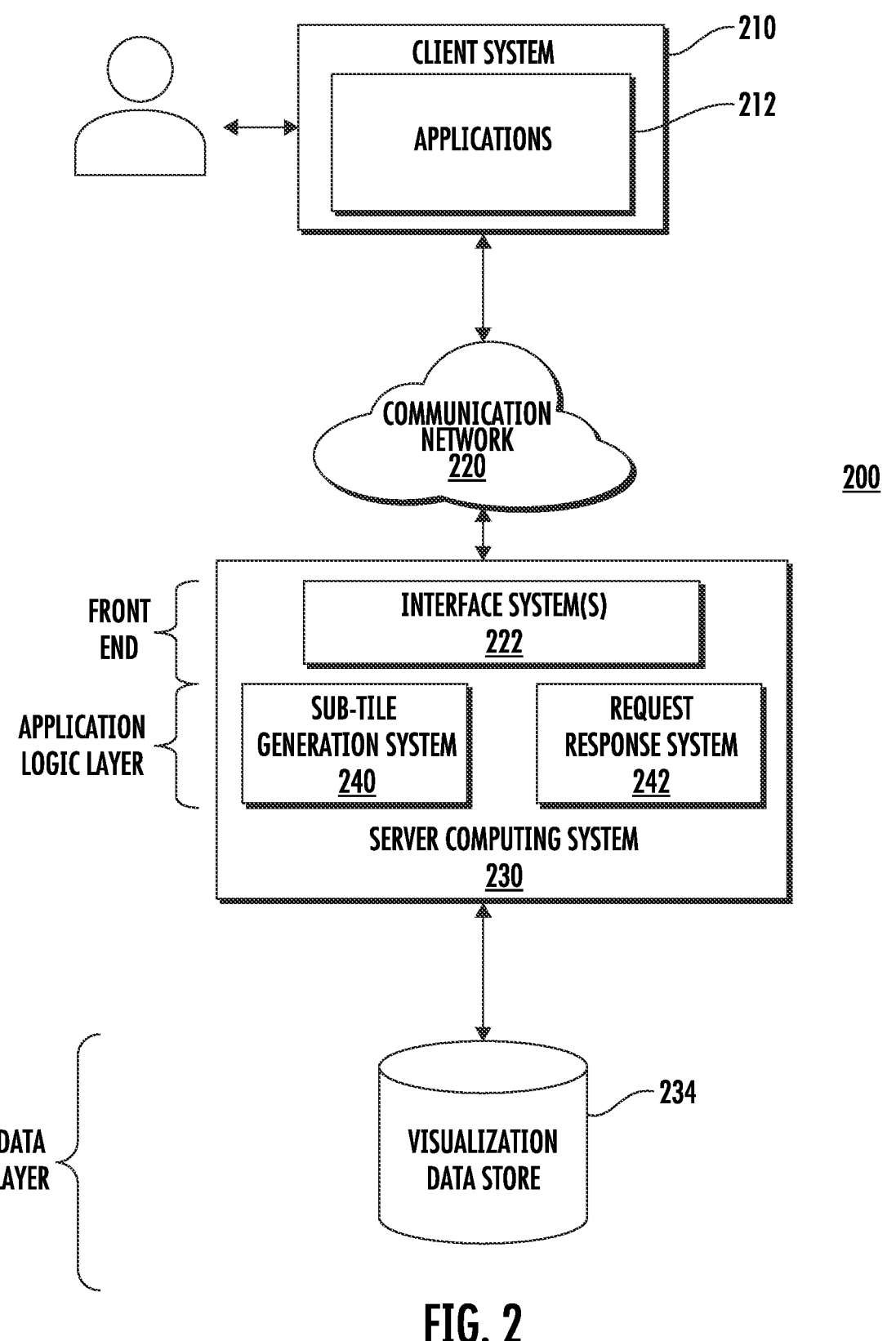
FIG. 2 illustrates an example client-server computing environment in accordance with example embodiments of the present disclosure.

FIG. 2 depicts an example client-server environment 200 according to example embodiments of the present disclosure. The client-server system environment 200 includes one or more client systems 210 and a server computing system 230. One or more communication networks 220 can interconnect these components. The communication networks 220 may be any of a variety of network types, including local area networks (LANs), wide area networks (WANs), wireless networks, wired networks, the Internet, personal area networks (PANs), or a combination of such networks.

A client system 210 can include, but is not limited to, personal computers, laptops, computing systems integrated into vehicles, virtual reality systems, augmented reality devices (e.g., smart glasses), and so on. In some examples, the client system 210 can be any computing system that can be used to display visual data associated with a virtual world (or visual data associated with an augmented reality system), request visual data from the server computing system 230, and display the resulting rendered images.

In some examples, the client system 210 can include one or more application(s) 212 such as search applications, communication applications, navigation applications, productivity applications, game applications, word processing applications, or any other applications. The application(s) can include a web browser. The client system 210 can use a web browser (or other application) to send and receive requests to and from the server computing system 230. The application(s) can include a virtual world visual data display system that displays rendered images based on a location within a virtual world.

In some examples, the client system 210 can be associated with a user of an application associated with a virtual world. For example, the application 212 can be a game application with an associated virtual world. In some examples, the application 212 can be a virtual representation of the physical world. The user can navigate through a virtual world and as a result, the application 212 can display an updated representation of the virtual world based on the user's location within the virtual world and viewing orientation. Rather than storing the data necessary to visually depict the entire virtual world at the client system 210, a server computing system 230 can provide the data for visually depicting a describing the entire virtual world. To receive this data, the client system 210 can send a request to the server computing system 230. The request can include a location within the virtual world and a description of the viewing area, including, height, width, depth, and resolution. The server computing system 230 can respond with either fully rendered images to display or data that still requires local rendering before it is ready to display to a user.

As shown in FIG. 2, the server computing system 230 can generally be based on a three-tiered architecture, consisting of a front-end layer, application logic layer, and data layer. As is understood by skilled artisans in the relevant computer and Internet-related arts, each component shown in FIG. 2 can represent a set of executable software instructions and the corresponding hardware (e.g., memory and processor) for executing the instructions. To avoid unnecessary detail, various components and engines that are not germane to conveying an understanding of the various examples have been omitted from FIG. 2. However, a skilled artisan will readily recognize that various additional components and engines may be used with a server computing system 230, such as that illustrated in FIG. 2, to facilitate additional functionality that is not specifically described herein. Furthermore, the various components depicted in FIG. 2 may reside on a single server computer or may be distributed across several server computers in various arrangements. Moreover, although the server computing system 230 is depicted in FIG. 2 as having a three-tiered architecture, the various example embodiments are by no means limited to this architecture.

As shown in FIG. 2, the front end can consist of an interface system(s) 222, which receives communications from one or more server client environments 200 and communicates appropriate responses to the server client environments 200. For example, the interface system(s) 222 may receive requests in the form of Hypertext Transfer Protocol (HTTP) requests, or other web-based, application programming interface (API) requests. The client system 210 may be executing conventional web browser applications or applications that have been developed for a specific platform to include any of a wide variety of computing devices and operating systems.

As shown in FIG. 2, the data layer can include a visualization data store 234. The visualization data store 234 can store a variety of data that is useful for generating images of a virtual world for display to a user. The data describing the three-dimensional world can be stored as a three-dimensional model of the world. For example, the data can be stored as a three-dimensional mesh with a series of points defining the boundaries of objects and with accompanying texture data for applying the appropriate image to the 3D model. Other three-dimensional modeling techniques such as parametric models, voxel-based models, and so on can be used. In some examples, other representations such as 3D point clouds or depth maps may also be used.

The three-dimensional space of the virtual world is divided into a plurality of volumetric portions. These volumetric portions can be referred to as three-dimensional tiles. Each three-dimensional tile can be associated with a particular section of the three-dimensional virtual world. Each three-dimensional tile can have one or more objects within it that are depicted when an image is generated of the tile. These objects can be defined based on three-dimensional models based on points at the vertices of the objects. As noted above, other methods of representing objects can be used. In addition to the vertices, textures can be used to determine the appearance of the object when representing the object in the view of the user.

The visualization data store 234 can also store sub-tile data when it has been generated. Each sub-tile is associated with a particular tile and is associated with a particular viewing angle of the tile. For example, a particular sub-tile can represent the view of the three-dimensional tile when viewed from above. In some examples, six sub-tiles are generated for each three-dimensional tile. Additionally, or alternatively, a different number of tiles can be used depending on the needs of the three-dimensional world and the display system.

The sub-tile data can be stored in the visualization data store 234. Once stored the sub-tile data can be used in responding to requests from client systems 210. Once a request is received, the server computing system 230 can identify the appropriate sub-tiles and prepare them for use in generating images for display at the client system 210.

The sub-tile generation system 240 can be used to process data associated with a plurality of three-dimensional tiles to generate a plurality of sub-tiles for each tile. As noted above, one example of the number of sub-tiles can be six sub-tiles. However, other numbers of sub-tiles can be used as needed.

To generate sub-tiles, that sub-tile generation system 240 can access data associated with a particular three-dimensional tile. The sub-tile generation system 240 can identify a plurality of faces for the particular three-dimensional tile. In some examples, the three-dimensional data stored for the tile includes points that represent the vertices of a wireframe sketch of one or more objects. In this case, the sub-tile generation system can process the points to identify one or more faces of the object. In other examples, the tile data includes data describing faces already. The data associated with face can be data describing the size of the face, the angle of the face, and any other information associated with the appearance of the face (e.g., its color, shape, any textures associated with it, and so on).

Once the location, size, orientation, and appearance of each face in a particular tile has been identified, the sub-tile generation system 240 can assign each face to a particular sub-tile. To assign a face to a sub tile, the sub-tile generation system 240 can compare the angle of the face to the viewing angle or viewing orientation associated with each sub tile. Thus, a face that is primarily facing upwards, may be assigned to the sub-tile that is associated with the view when viewed from above. Similarly, faces that face west can be associated with a sub-tile that is associated with a view from the west. Each service can be assigned to a particular sub-tile until all the services have been assigned. Once all the faces have been assigned, this sub-tile can be stored in the visualization data store 234.

In some examples, the request response system 242 can receive a request through the interface system 222. In some examples, the request can include a location within the virtual world, a viewing orientation, and a size of a viewing window. The request response system 242 can determine, based on the received location, the viewing orientation, and the size of viewing window one or more three-dimensional tiles that can be selected. The selected three-dimensional tiles can be used to generate an image of the virtual world. It should be noted that the request can also include a viewing resolution.

The request response system 242 can access, from the visualization data store 234, one or more sub-tiles for each tile that is to be shown in the image associated with the user request. The selected sub-tiles are selected based on the viewing orientation of the user. In this way, only sub-tiles that include faces that will be visible from the viewing angle are selected. In this way faces that are occluded from the viewing angle (e.g., on the backside of objects from the viewing point of the request) can be excluded from response to the request. This allows the rendering of the image to be more efficient.

In some examples, the request response system 242 performs one or more prerendering steps on the selected sub-tiles before transferring them to the requesting client system 210. In some examples, the request response system 242 performs the entire rendering operation and transmits one or more images to the client system 210 in response to the request. In other examples, the sub-tile data itself is transmitted to the client system without any pre-processing. In all three cases, the data transmitted to the client system is reduced such that less bandwidth is used and/or the amount of data needed during the rendering process is reduced, increasing the efficiency and speed of the rendering process while reducing the amount of power and processing time needed.

Figure 3:
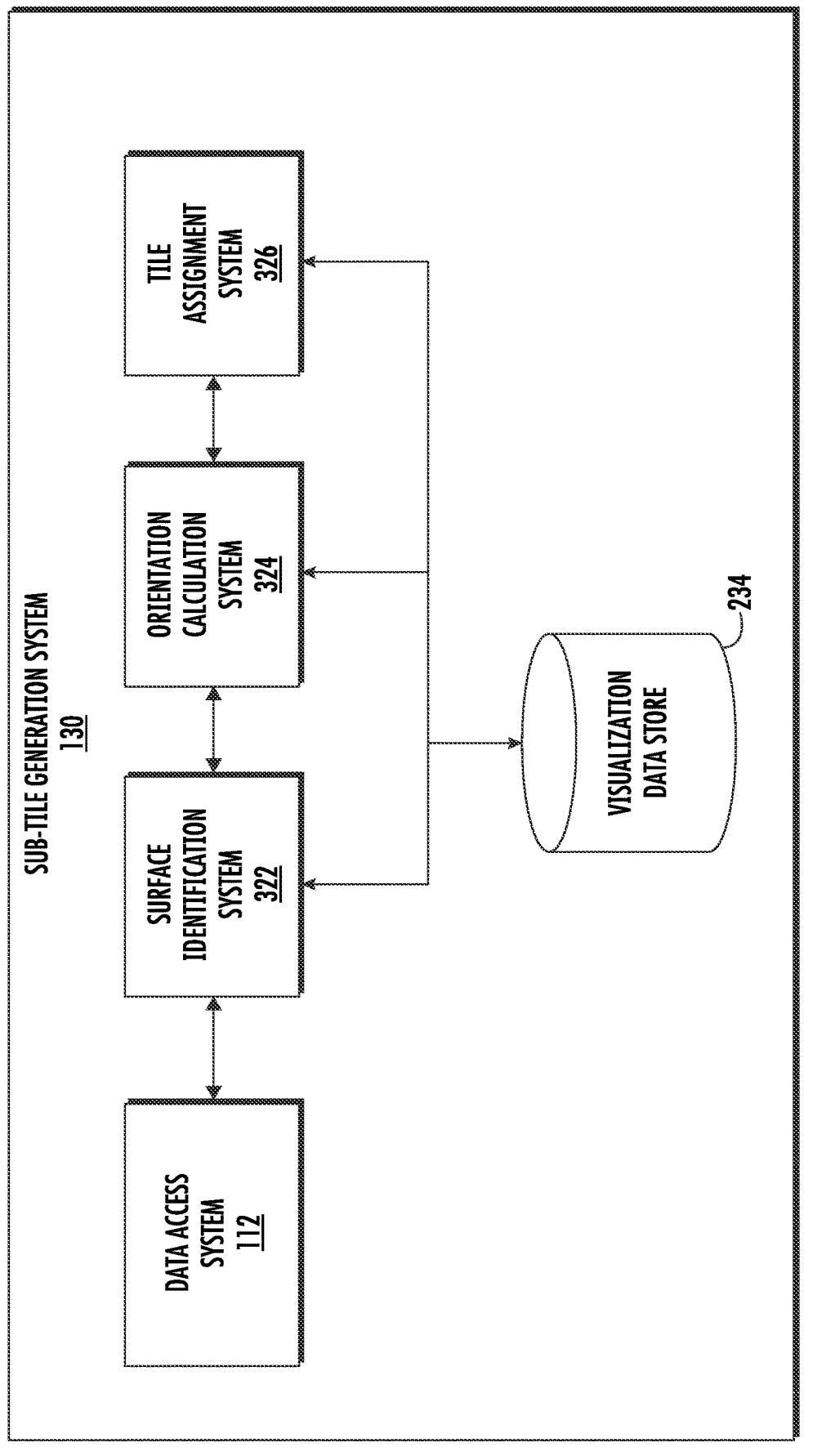
FIG. 3 illustrates an example sub-tile generation system in accordance with example embodiments of the present disclosure.

FIG. 3 illustrates an example sub-tile generation system 130 in accordance with example embodiments of the present disclosure. The sub-tile generation system 130 can include a data access system 112, a face identification system 322, an orientation calculation system 324, and a tile assignment system 326.

For example, the sub-tile generation system 130 can produce a series of sub-tiles for each three-dimensional tile in a plurality of three-dimensional tiles associated with the virtual world. By producing these sub-tiles upfront (either one time or periodically as needed), the server computing system can improve the efficiency of providing visual information to client systems. For example, the server system can reduce the total amount of information that is transmitted to the client system and/or reduce the amount of calculation needed to render one or more images of the virtual world.

To do so, the data access system 112 can access data for one or more three-dimensional tiles. In some examples, the data for the tiles is stored in the visualization data store 234. Additionally, or alternatively, the data associated with the tiles can be stored at a remote computing system that the sub-tile generation system 130 accesses over a network using the data access system 112.

The tile data can be provided to the face identification system 322. The face identification system 322 can identify one or more services contained within a particular tile. As noted above, in some examples the tile data will include a direct description of a plurality of faces that comprise the objects within the tile. In other examples, the face identification system 322 can perform analysis on the three-dimensional 3D data to identify a plurality of tiles based on vertex or point data that exists within the tile data. For each face, the face identification system 322 can identify a location, a size, and an appearance.

The list of faces can be transmitted to the orientation calculation system 324. The orientation calculation system 324 can determine, for each face, an orientation or angle associated with the face. In some examples, the angle associated with the face can be determined based on the position and orientation of the face within the virtual world.

Once orientations have been calculated for each face, the tile assignment system 326 can assign each face to the sub-tile with which it is most closely aligned. For example, if a sub-tile is associated with the view the user would have from above the tile, the faces that are primarily oriented towards the top of the tile can be assigned to that sub-tile. The same process can be followed for each face until all the faces have been associated with a particular sub-tile. This tile assignment system 326 can store the sub-tiles in the visualization data store 234.

Figure 4:
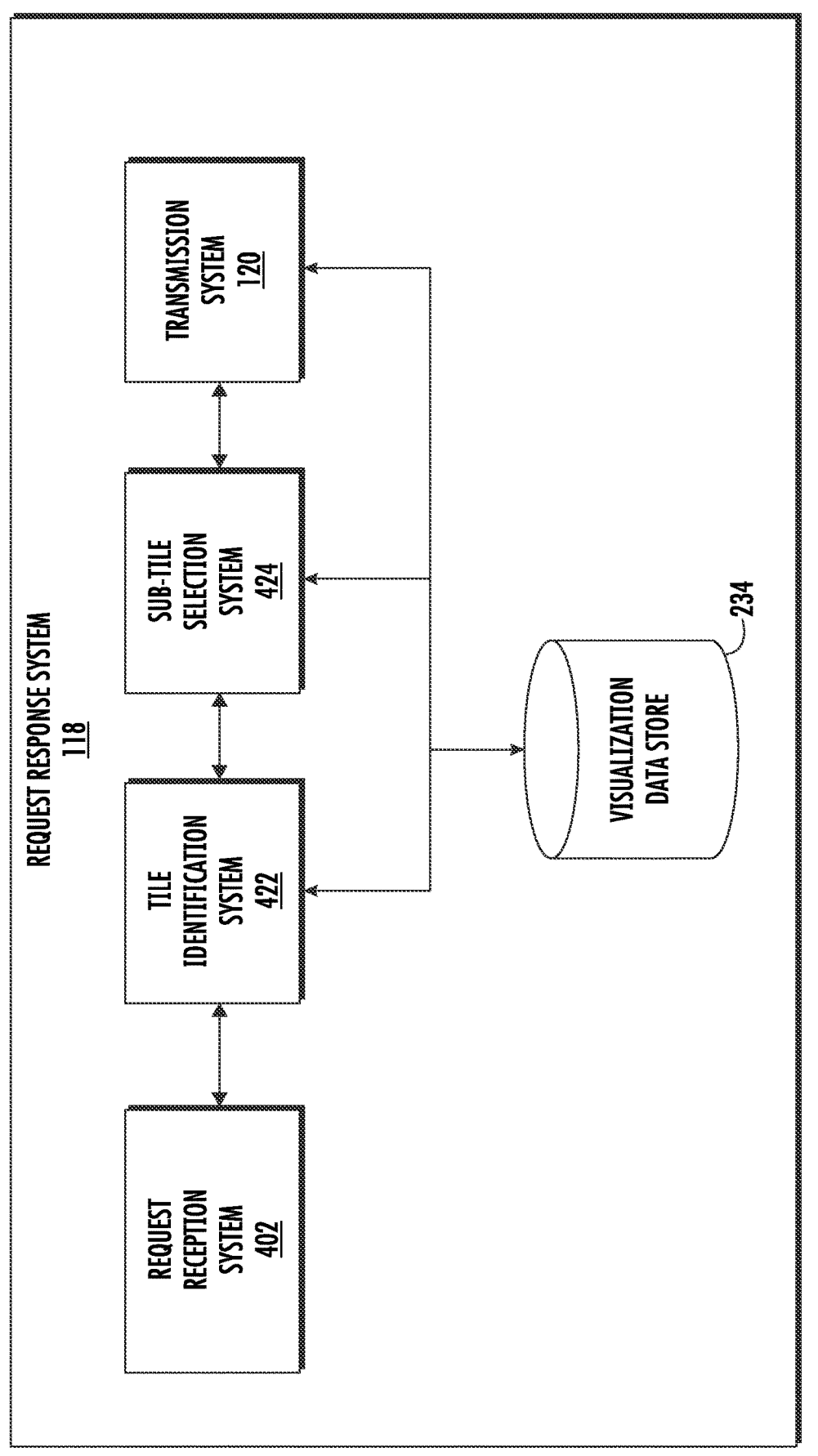
FIG. 4 depict an example request processing system according to example embodiments of the present disclosure.

FIG. 4 depicts an example request processing system according to example embodiments of the present disclosure. A request response system 118 can include a request reception system 402, a tile identification system 422, a sub-tile selection system 424, and a transmission system 120. Each of these systems can access data from a visualization data store 234 to perform their tasks.

The request reception system 402 can receive a request for visualization data from a client system 210. The request can include a location within a virtual world, a viewer location, a view window size, and a resolution value. Once the request has been received by the request reception system 402, you can pass the relevant data to the tile identification system 422.

The tile identification system 422 can determine, based on data within the request, which specific three-dimensional tiles or portions of the virtual world will be used to generate the image requested. For example, the three-dimensional tile at which the location of space can be selected, and one or more sub-tiles that are in the direction that the view is pointing. Additional three-dimensional tiles may be selected based on the width or height of the viewing aperture, as well as additional data associated with increased resolutions, if needed.

In some examples, only one or two three-dimensional tiles will be selected by that tile identification system 422. However, in some examples, more than two tiles can be selected based on the location of the viewer, the viewing orientation, the scope of the view, and the desired resolution. In some examples, additional detail for additional resolution can be determined based on a hierarchical set of three-dimensional tiles in which child three-dimensional tiles provide additional detail for the parent three-dimensional tiles.

Once one or more three-dimensional tiles have been selected, the selected tiles can be transferred to the sub-tile selection system 424. The sub-tile selection system 424 can select one or more sub-tiles for each identified tile. The sub-tiles are selected such that the selected sub-tiles represent only those sub-tiles that would be viewable from the user's viewing position. Thus, sometimes associated with the back or far sides of a three-dimensional tile will not be selected. In this way, the sub-tile selection system 424 can select half or less than half of the total number of sub-tiles available.

In some examples, the transmission system 426 can receive the sub-tiles selected by the sub-tile selection system 424 and transmit them to the requesting client system 210. In some examples, the request response system 118 or the associated server system can perform one or more preprocessing steps to render an image from the data. In some examples, the selected sub-tile data can be sent to the requesting client system 210 without any preprocessing.

Figure 5:
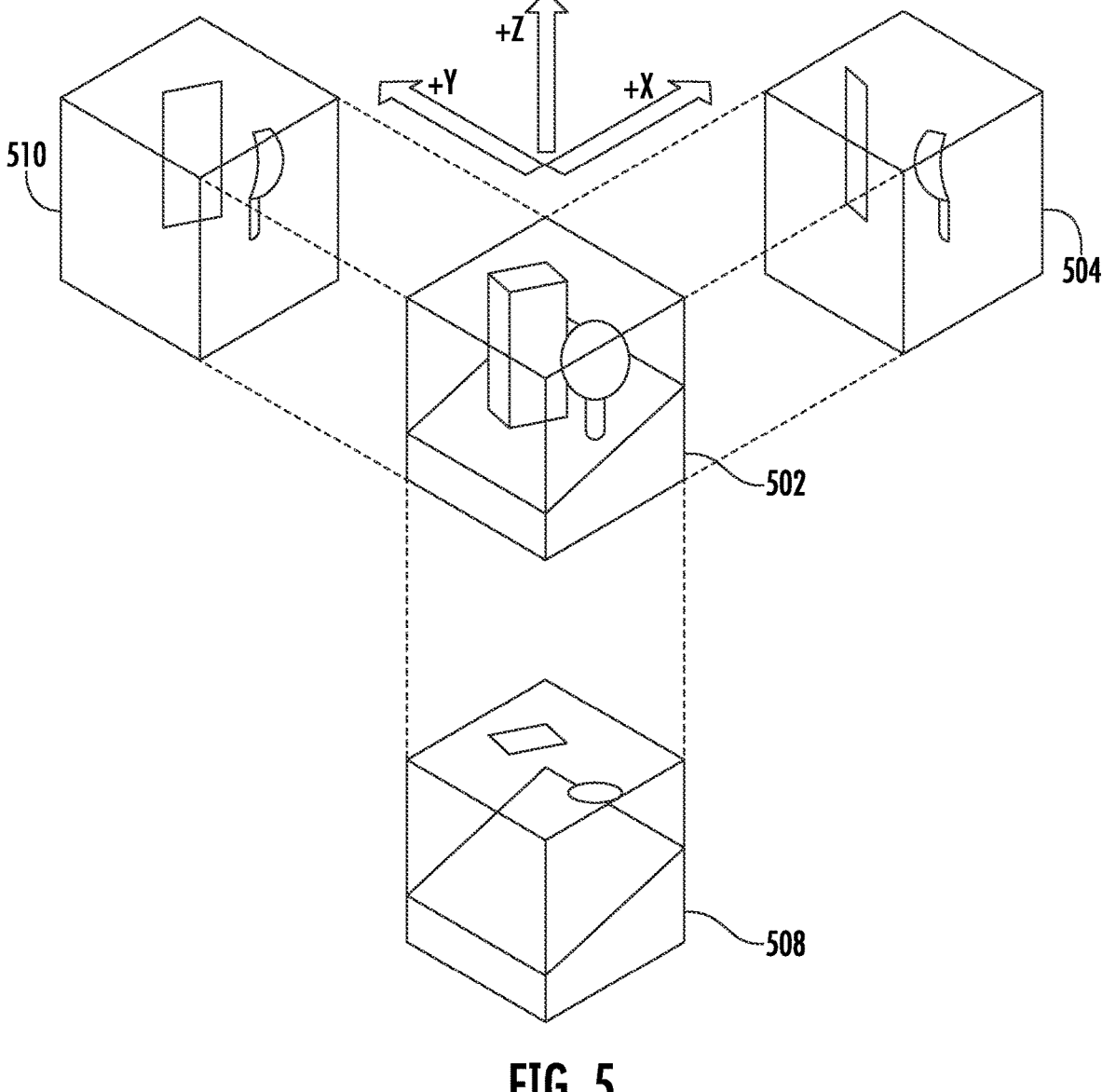
FIG. 5 illustrates an example diagram of multiple sub-tiles in accordance with example embodiments of the present disclosure.

FIG. 5 illustrates an example diagram of multiple sub-tiles in accordance with example embodiments of the present disclosure. This view includes a three-dimensional tile 502 with one or more objects depicted as inside. This three-dimensional tile 502 can be divided into a plurality of sub-tiles. In this example, three sub-tiles are depicted but six total sub-tiles are implied. The depicted sub-tiles include a sub-tile associated with a positive x direction 504, a sub-tile associated with positive y direction 510, and a sub-tile associated with the negative-z direction 508.

Not depicted here but implied is corresponding sub-tiles that are in the negative direction of each of x and y, and a sub-tile that corresponds with the positive direction of z. As depicted here, the sub-tiles only include the faces that are associated with a user viewing from that direction. Thus, the positive x sub-tile 504 includes the front view of the objects. Similarly, the positive y sub-tile 510 and the z negative sub-tile 508 include only those faces most closely associated with viewing from a particular direction.

Again, although not pictured, the corresponding negative sub-tiles will include, for example, the view from the bottom of all objects (if the objects are visible at all from the bottom). Similar negative X and negative Y sub-tiles will show objects from the opposite direction of their corresponding positive sub-tiles. In this way, any viewing direction can be represented as a combination of up to three sub-tiles. In this way, data associated with the other sub-tiles can be omitted from the transmission steps and or the rendering steps resulting in increased efficiency.

FIG. 6 illustrates an example flow diagram in accordance with example embodiments of the present disclosure. One or more portion(s) of the method can be implemented by one or more computing devices such as, for example, the computing devices described herein. Moreover, one or more portion(s) of the method can be implemented as an algorithm on the hardware components of the device(s) described herein. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. The method can be implemented by one or more computing devices, such as one or more of the computing devices depicted in FIGS. 1-4.

A computing system (e.g., computing system 100 in FIG. 1) can access, at 602, data associated with a plurality of three-dimensional tiles, each tile representing a portion of a virtual space. In some examples, the computing system 100 is a server computing system. In some examples, the virtual space can be associated with a virtual world. Such a virtual world can be associated with a game application or a virtual reality application. In some examples, the virtual space is associated with a geographic location. For example, a virtual replication of the physical world based on satellite imagery.

In some examples, the three-dimensional tiles can be associated with volumetric portions of the virtual world. The data associated with each respective three-dimensional tile in the plurality of three-dimensional tiles can include, for a respective three-dimensional tile, data defining one or more objects within the portion of the virtual space associated with the respective three-dimensional tile. In some examples, the one or more objects comprise a plurality of faces, each face having a size, appearance, and orientation.

In some examples, the one or more objects can be defined by one or more points representing the boundaries of an object. However, other methods of representing the objects can be used to represent the data for objects within a particular three-dimensional tile. For example, objects can be represented using point clouds, range images, meshes, parametric definitions, voxels, and so on.

For a respective three-dimensional tile in the plurality of three-dimensional tiles, the computing system 100 can generate, at 604, a plurality of sub-tiles, wherein a respective sub-tile in the plurality of sub-tiles represents a portion of one or more objects included in the respective three-dimensional tiles that are viewable from a particular viewing orientation. For example, the sub-tiles can represent the objects (and faces) that are visible from the perspective of a viewer viewing the three-dimensional tile from the particular viewing orientation.

In some examples, the computing system 100 can determine, for each face of an object associated with the respective three-dimensional tile, a sub-tile with a viewing orientation that most closely matches the orientation of the respective face. For example, the computing system can calculate a similarity between the angle of a particular face and the angle of each sub-tile. This calculation can be performed using a cosine similarity method. Other methods can also be used.

The computing system 100 can assign a particular face to a sub-tile to which it was most similar. In this way, each face in a particular three-dimensional tile can be assigned to a particular sub-tile. In some examples, the plurality of sub-tiles comprises six sub-tiles for each three-dimensional tile. In some examples, the plurality of sub-tiles includes one or more sub-tiles pairs, a sub-tile pair comprising two sub-tiles that are associated with opposite viewing orientations.

In some examples, the computing system can, at 606, receive, from a client device, a request for data associated with one or more three-dimensional tiles, the request including a location within the virtual space and a viewing orientation. In some examples, the location within the virtual space is determined based on a geographic location. In some examples, the request can also include a requested resolution and a field of view (e.g., the width, height, and depth of data to be displayed).

In some examples, the computing system 100 can determine, at 608, one or more three-dimensional tiles associated with the request based on the location. The computing system 100 can select, at 610, one or more sub-tiles from the one or more three-dimensional tiles, based, at least in part, on the viewing orientation. Selecting sub-tiles can include calculating the difference between the viewing angle and the viewing orientation associated with each potential sub-tile. The computing system 100 can select up to half of all possible sub-tiles based on the location of the viewer and the viewing orientation.

The computing system 100 can transmit, at 612, the selected one or more sub-tiles to the client device for display. In some examples, the computing system 100 can, prior to transmitting the selected one or more sub-tiles to a client device for display, generate one or more images from the one or more sub-tiles using a rendering process. Additionally, or alternatively, the computing system 100 can generate pre-rendered data to enable the client system to generate images for display using a rendering process.

The technology discussed herein makes reference to sensors, servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method, the method comprising:

accessing, by a computing system comprising one or more computing devices, data associated with a plurality of three-dimensional tiles, each three-dimensional tile representing a portion of a virtual space;

for a respective three-dimensional tile in the plurality of three-dimensional tiles:

generating, by the computing system, a plurality of sub-tiles, wherein a respective sub-tile in the plurality of sub-tiles represents a portion of one or more objects included in the respective three-dimensional tile that is associated with a particular viewing orientation and the plurality of sub-tiles includes one or more sub-tiles pairs, each sub-tile pair comprising two sub-tiles that are associated with opposite viewing orientations;

receiving, by the computing system and from a client device, a request for data associated with one or more of the three-dimensional tiles, the request including a location within the virtual space and a viewing orientation;

determining, by the computing system, the one or more of the three-dimensional tiles associated with the request based on the location;

selecting, by the computing system, one or more sub-tiles from the one or more of the three-dimensional tiles, based, at least in part, on the viewing orientation; and transmitting, by the computing system, the selected one or more sub-tiles to the client device for display.

2. The computer-implemented method of claim 1, wherein the data associated with the plurality of three-dimensional tiles includes, for a respective three-dimensional tile, data defining one or more objects within the portion of the virtual space associated with the respective three-dimensional tile.

3. The computer-implemented method of claim 2, wherein the one or more objects comprise a plurality of faces, each face having a size, appearance, and orientation.

4. The computer-implemented method of claim 3, wherein generating the plurality of sub-tiles comprises:

determining, for each face associated with the respective three-dimensional tile, a sub-tile with a viewing orientation that most closely matches the orientation of the respective face; and assigning, the respective face to the determined sub-tile.

5. The computer-implemented method of claim 1, wherein the plurality of sub-tiles comprises six sub-tiles for each three-dimensional tile.

6. The computer-implemented method of claim 1, wherein each face is only assigned to a single sub-tile.

7. The computer-implemented method of claim 1, wherein the virtual space is associated with a geographic location.

8. The computer-implemented method of claim 7, wherein the location within the virtual space is determined based on the geographic location.

9. The computer-implemented method of claim 1, wherein the virtual space is associated with an augmented reality application.

10. The computer-implemented method of claim 1 wherein the virtual space is associated with a game application.

11. The computer-implemented method of claim 1, further comprising, prior to transmitting the selected one or more sub-tiles to a client device for display:

generating one or more images from the one or more sub-tiles using a rendering process.

12. The computer-implemented method of claim 1, wherein transmitting the selected one or more sub-tiles to a client device for display comprises:

generating, by the one or more computing devices, pre-rendering data to enable the client system to generate images for display using a rendering process.

13. A computing system comprising:

one or more processors; and a computer-readable memory that stores instructions that, when executed by the one or more processors, cause the computing system to perform operations, the operations comprising:

accessing data associated with a plurality of three-dimensional tiles, each three-dimensional tile representing a portion of a virtual space;

for a respective three-dimensional tile in the plurality of three-dimensional tiles:

generating a plurality of sub-tiles, wherein a respective sub-tile in the plurality of sub-tiles represents a portion of one or more objects included in the respective three-dimensional tile that is associated with a particular viewing orientation and the plurality of sub-tiles includes one or more sub-tiles pairs, each sub-tile pair comprising two sub-tiles that are associated with opposite viewing orientations;

receiving, from a client device, a request for data associated with one or more of the three-dimensional tiles, the request including a location within the virtual space and a viewing orientation;

determining the one or more of the three-dimensional tiles associated with the request based on the location;

selecting one or more sub-tiles from the one or more of the three-dimensional tiles, based, at least in part, on the viewing orientation; and transmitting the selected one or more sub-tiles to the client device for display.

14. A non-transitory computer-readable storage medium storing instruction that, when executed by one or more computing devices, cause the one or more computing devices perform operations, the operations comprising:

accessing data associated with a plurality of three-dimensional tiles, each three-dimensional tile representing a portion of a virtual space;

for a respective three-dimensional tile in the plurality of three-dimensional tiles:

generating a plurality of sub-tiles, wherein a respective sub-tile in the plurality of sub-tiles represents a portion of one or more objects included in the respective three-dimensional tile that is associated with a particular viewing orientation and the plurality of sub-tiles includes one or more sub-tiles pairs, each sub-tile pair comprising two sub-tiles that are associated with opposite viewing orientations;

receiving, from a client device, a request for data associated with one or more of the three-dimensional tiles, the request including a location within the virtual space and a viewing orientation;

determining the one or more of the three-dimensional tiles associated with the request based on the location;

selecting one or more sub-tiles from the one or more of the three-dimensional tiles, based, at least in part, on the viewing orientation; and transmitting the selected one or more sub-tiles to the client device for display.

15. The non-transitory computer-readable storage medium of claim 14, wherein the data associated with the plurality of three-dimensional tiles includes, for a respective three-dimensional tile, data defining one or more objects within the portion of the virtual space associated with the respective three-dimensional tile.

16. The non-transitory computer-readable storage medium of claim 15, wherein the one or more objects comprise a plurality of faces, each face having a size, appearance, and orientation.

17. The non-transitory computer-readable storage medium of claim 16, wherein generating the plurality of sub-tiles comprises:

determining, for each face associated with the respective three-dimensional tile, a sub-tile with a viewing orientation that most closely matches the orientation of the respective face; and assigning, the respective face to the determined sub-tile.

18. The non-transitory computer-readable storage medium of claim 14, wherein the plurality of sub-tiles comprises six sub-tiles for each three-dimensional tile.

* * * * *